March 24, 1925.

H. B. MARSHALL

THREE-WIRE SYSTEM REGULATION

Filed June 11, 1923

1,531,240

Inventor:
Harry B. Marshall
By Albert Scheible, Atty.

Witness:
W. K. Olson

Patented Mar. 24, 1925.

1,531,240

UNITED STATES PATENT OFFICE.

HARRY B. MARSHALL, OF ST. LOUIS, MISSOURI.

THREE-WIRE-SYSTEM REGULATION.

Application filed June 11, 1923. Serial No. 644,790.

*To all whom it may concern:*

Be it known that I, HARRY B. MARSHALL, a citizen of the United States, residing at St. Louis, Missouri, have invented certain new and useful Improvements in Three-Wire-System Regulation; and I do hereby declare the following to be a full, clear, and exact description of the invention, such as will enable others skilled in the art to which it appertains to make and use the same.

My invention relates to the controlling of the voltage on a three-wire distribution system and in general aims to provide means for effectively regulating the voltage on the system while positively limiting the voltage on one side of the neutral wire to a predetermined maximum.

In using three-wire distribution systems it has heretofore been customary to employ means for regulating the voltage between the two outer wires, leaving the distribution of the voltage at opposite sides of the neutral wire to fluctuate according to the relative proportions of the loads on opposite sides of the neutral. While such a regulation is satisfactory for most purposes, it has the serious disadvantage that the voltage on either side of the neutral may rise to a considerable extent above the desired normal (or above one-half of the total normal voltage) in case the load on that side is considerably less than the load at the opposite side of the neutral. While such a rise of voltage at one side of the neutral may be overlooked on 220 volt lighting circuits, even an apparently small rise may prove serious on a low voltage circuit used for charging storage batteries, owing to the damaging effect of this excessive voltage on the batteries.

My invention aims to overcome this defect of the customary regulation of three-wire distribution systems by providing simple means whereby the voltage on one side of the neutral will be automatically and accurately regulated, and whereby the voltage will be limited to a predetermined maximum on both sides of the neutral. Furthermore, my invention aims to provide a regulating system for this purpose which can readily be applied to standard types of three-wire generators, which will be inexpensive and which will be entirely automatic in operation. In one of its immediate commercial applications, my invention is particularly suited for use in connection with battery charging systems where the maintaining of a substantially constant and carefully limited voltage allows of a great reduction in the time required for charging the batteries. I am therefore illustrating and describing the same as employed in such a connection, although I do not wish to be limited as to the uses of the generators and distribution systems in connection with which my invention may be employed. Illustrative of my invention, Fig. 1 is a diagrammatic view showing my regulating and voltage-limiting arrangement as used in connection with a three-wire system battery charging system.

Figure 1:
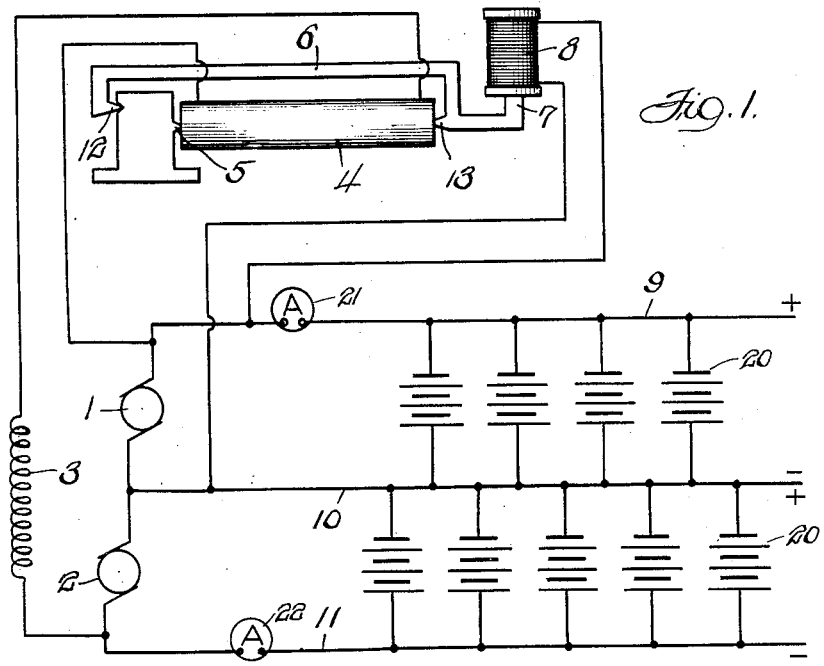

Referring first to the diagram of Fig. 1, this shows a three-wire generator having two armature windings 1 and 2 both disposed within a magnetic field or fields produced by a field coil winding 3, and also shows a compressible resistance 4 as connected in series with the two armatures and the said field winding. This compressible resistance (which desirably is in the form of the resistance unit disclosed in my copending application No. 627,643 as filed March 26, 1923) is floatingly supported between a stationary pivot point 5 and a second pivot point carried by a rocking lever 6, and the rocking lever 6 carries a core 7 extending into a solenoid 8 which is connected across the terminals 9 and 10 of the armature 1. With the parts thus arranged, and with the pivot 12 of the lever 6 out of alinement with the two pivot points 5 and 13 which engage the opposite ends of the compressible resistance, a lifting of the core 7 will cause the lever to swing upwardly in a counter-clockwise direction, so as to reduce the compression of the resistance 4, while a lowering of the core 7 will swing the lever in the opposite direction so as to increase the compression of the resistance. Consequently, gravity will continuously tend to move the lever in a resistance decreasing direction while the flow of current through the solenoid 8 will tend to move the lever in the opposite or compression reducing direction, as more fully disclosed in application No. 594387 filed on October 13, 1922 by Pierre I. Chandeysson on a carbon pile support.

With the connections made as in Fig. 1, it will be obvious that an increase in the load across the armature 1, or between the outer wire 9 and the neutral 10 of the distribution system will tend to reduce the voltage on that side of the system and hence will permit gravity to swing the lever downward so as to increase the compression of the resistance unit. This reduces the effective resistance of the said unit, thereby increasing the flow of current through the field winding of the generator and causing the latter to raise its generated voltage. On the other hand, a decrease in the load on that side of the distribution system will tend to increase the voltage, thereby causing the solenoid 8 to exert a stronger pull and correspondingly increasing the resistance of the unit 4 so as to decrease the effective strength of the field winding and lower the voltage of the generator.

Figure 3:
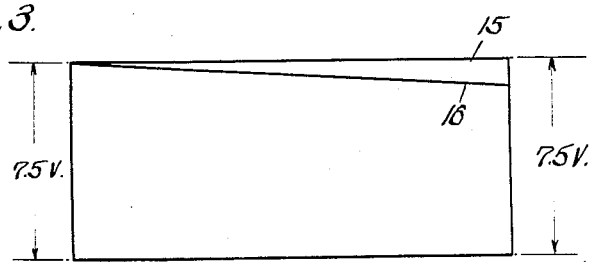
Fig. 3 is a similar diagram showing the voltage variation at opposite sides of the neutral when employing my system after the manner of Fig. 1.

Consequently, with the solenoid 8 connected between the neutral and the "plus" outer wire and with a suitably constructed and adjusted resistance unit, the voltage on that side of the neutral (provided that this side has a lighter load than the other side) will automatically be maintained constant, as shown by the voltage line 15 in Fig. 3, although the corresponding voltage line 16 for the other side of the system may droop with an increasing load on that side as also shown in the same figure. That is to say, if the loading on both sides of the neutral were exactly equal, the regulation as effected from one side would maintain a constant voltage at both sides of the neutral. With the heavier load on the non-regulation-effecting side, the voltage on that side will drop more or less according to the excess of load over that on the other side, but also will never exceed the maximum for which the system is designed.

Owing to this positive limitation of the voltage at both sides of the neutral, my invention can be used with high effectiveness for purposes where such a restriction of the maximum voltage is highly important. For example, in charging three-cell storage batteries from a three-wire generator having a nominal voltage of 15, the batteries can be distributed over the two sides of the system and by keeping the lighter load on the side from which the regulation is effected, I can readily maintain the potential on that side at exactly 7.5 volts while permitting the voltage on the other side to drop slightly lower. By thus operating at a closely maintained and high charging voltage I can greatly reduce the time required for the battery charging and can do so without risking a damaging effect on the batteries through a rise of potential above 7.5 volts. In practice, it is quite easy to proportion the batteries so as to maintain the lighter charging load on the regulation-controlling side, hence my regulating system can readily be manipulated even by a layman.

Figure 2:
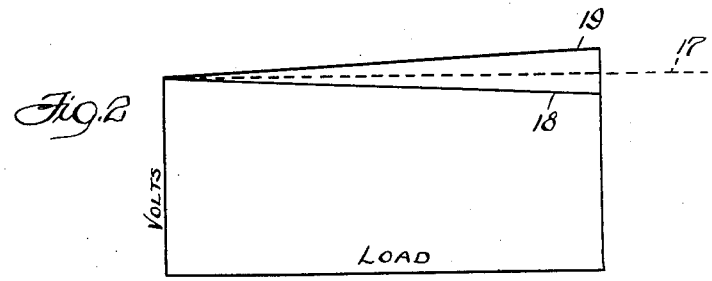
Fig. 2 is a diagram showing the variations of voltage at opposite sides of the neutral in a three-wire distribution system in which the total voltage is regulated in the heretofore customary manner by merely controlling the total voltage.

That is to say, by watching the usual ammeters 21 and 22 as respectively connected in series with the plus wire 9 and the minus wire 11, the operator can readily see which carries the heavier current, and if this heavier current is on the regulation-controlling side, he can shift one or more of the batteries 20 from this side of the neutral to the other. By this simple manipulation, he can readily secure the effect shown diagrammatically in Fig. 3, where the line 15 shows the voltage between the neutral and the plus wire 9 of Fig. 1, while the line 16 shows that between the neutral and the minus wire. If the regulation were effected from the voltage between the outer wires as shown in Fig. 2, it will readily be seen that since only the total voltage is regulated in the latter, the average voltage remains constant as shown by the dotted line 17, and the voltage on the more heavily loaded side droops as shown by the line 18. However, the voltage on the more lightly loaded side rises correspondingly, as shown by the line 19 and this rise in voltage is apt to be quite deleterious to any batteries which are being charged from that side of the system. Hence the decided advantage of my arrangement will be obvious from this comparison.

However, while I have described my invention as applied to a battery charging system, I do not wish to be limited to any particular use of the same. Neither do I wish to be limited to the use of the particular resistance unit and compression regulating mechanism above mentioned, as these as well as other details of the presented construction and arrangement might obviously be varied in many ways without departing from the spirit of my invention or from the appended claims.

I claim as my invention:

1. The combination with a three-wire generator having armature windings respectively connecting the neutral wire with the two outer wires of its distribution circuit, and having field exciting means connected across the two outer wires and having unbalanced load at opposite sides of the neutral, of a resistance in series with the field exciting means and means responsive to the voltage on the lighter loaded side of the circuit for varying the resistance.

2. The combination with a three-wire generator having armature windings respectively connecting the neutral wire with the two outer wires of its distribution circuit, and having field exciting means connected across the two outer wires and having unbalanced load at opposite sides of the neutral, of a compressible resistance in series with the field exciting means and means responsive to the voltage on the lighter loaded side of the circuit for varying the compression of the resistance.

3. The combination with a three-wire generator having armature windings respectively connecting the neutral wire with the two outer wires of its distribution circuit, and having field exciting means connected across the two outer wires and having unbalanced load at opposite sides of the neutral, of a compressible resistance in series with the field exciting means, an electro-magnet having its winding in shunt with the load on the lighter loaded side of the circuit, and means actuated by the electro-magnet for varying the compression of the resistance.

4. The combination with a three-wire generator having armature windings respectively connecting the neutral wire with the two outer wires of its distribution circuit, and having field exciting means connected across the two outer wires and having unbalanced load at opposite sides of the neutral, of an adjustable resistance in series with the field exciting means, an electromagnetic means for varying the adjustment of the resistance in response to the voltage on the lighter loaded side of the circuit; the said means including an electro-magnet having its winding in shunt with the load on the lighter loaded side of the circuit, a movable core for the electro-magnet, and a lever connected to the core and arranged for varying the adjustment of the resistance.

Signed at St. Louis, Missouri, May 28th, 1923.

HARRY B. MARSHALL.